US012662212B2

(12) United States Patent
Lauer

(10) Patent No.: US 12,662,212 B2
(45) Date of Patent: Jun. 23, 2026

(54) PEDAL COMPRISING A PEDAL AXLE, A BEARING MOUNTED THEREON, AND A SECURING ELEMENT

(71) Applicant: Sport Import GmbH, Edewecht (DE)

(72) Inventor: Swen Lauer, Garmisch-Partenkirchen (DE)

(73) Assignee: SPORT IMPORT GMBH, Edewecht (DE)

( * ) Notice: Subject to any disclaimer, the term of this patent is extended or adjusted under 35 U.S.C. 154(b) by 0 days.

(21) Appl. No.: 18/906,565

(22) Filed: Oct. 4, 2024

(65) Prior Publication Data

US 2025/0026437 A1 Jan. 23, 2025

Related U.S. Application Data

(63) Continuation of application No. PCT/EP2023/058553, filed on Mar. 31, 2023.

(51) Int. Cl.
*B62M 3/08* (2006.01)

(52) U.S. Cl.
CPC ..................................... *B62M 3/08* (2013.01)

(58) Field of Classification Search
CPC .................................. B62M 3/08; B62M 3/10
See application file for complete search history.

(56) References Cited

U.S. PATENT DOCUMENTS 1,050,383 A * 1/1913 Overton ................... B62M 3/08
74/594.4
3,717,047 A 2/1973 Hill 6,227,071 B1 5/2001 Coombe
11,524,745 B2 * 12/2022 Marinier ................ B62M 3/086
11,718,366 B2 * 8/2023 Favero ..................... B62M 3/08
74/594.4

(Continued)

FOREIGN PATENT DOCUMENTS

CN 1020108341018 A 7/2018
CN 111137395 A * 5/2020 .............. B62M 3/08
(Continued)

OTHER PUBLICATIONS

Machine translation of FR 2711963 A1 obtained on Jul. 2, 2025.*

(Continued)

*Primary Examiner* — Adam D Rogers
(74) *Attorney, Agent, or Firm* — Tarolli, Sundheim, Covell & Tummino LLP

(57) ABSTRACT

Described is a pedal having a pedal body having an insertion opening and a cavity which, starting from the insertion opening, extends into the pedal body. The pedal further has a pedal axle which is inserted into the pedal body through the insertion opening and extends into the pedal body along the cavity, and at least one bearing arranged on the pedal axle, which is configured to support the pedal body to be rotatable on the pedal axle. According to the invention, a securing element is provided, which is configured to support the bearing on the pedal axle in an axial direction with respect to the pedal axle, in order to secure the pedal axle against falling out from the pedal body, wherein the securing element extends from outside through the pedal body into the cavity to the bearing, and the securing element is accessible from outside.

12 Claims, 7 Drawing Sheets

(56)                    References Cited

U.S. PATENT DOCUMENTS

| | | | | |
|---|---|---|---|---|
| 2011/0247450 A1* | 10/2011 | Lai | ........................... | B62M 3/08 |
| | | | | 74/594.4 |
| 2015/0298762 A1* | 10/2015 | Lin | ......................... | B62M 3/08 |
| | | | | 74/594.4 |
| 2025/0026436 A1* | 1/2025 | Lauer | ....................... | B62M 3/08 |

FOREIGN PATENT DOCUMENTS

| | | | | | |
|---|---|---|---|---|---|
| DE | 3631877 | A1 * | 3/1988 | .............. | B62M 3/08 |
| DE | 202008009511 | U1 | 10/2008 | | |
| DE | 202010001906 | U1 | 2/2011 | | |
| DE | 202011102588 | U1 * | 11/2011 | .............. | B62M 3/08 |
| DE | 202015103462 | U1 * | 7/2015 | .............. | B62M 3/08 |
| DE | 202020103824 | U1 * | 8/2020 | .............. | B62M 3/08 |
| DE | 202020107438 | U1 * | 2/2021 | ......... | B29C 45/1671 |
| DE | 102019130268 | A1 * | 5/2021 | .............. | B62M 3/08 |
| EP | 3434573 | A1 * | 1/2019 | .............. | B62M 3/08 |
| EP | 3972892 | B1 * | 9/2022 | .............. | B62M 3/08 |
| FR | 2711963 | A1 * | 5/1995 | ............ | B62M 3/086 |
| FR | 3016332 | A1 * | 7/2015 | ............ | B62M 3/086 |
| WO | 2011010757 | A1 | 1/2011 | | |

OTHER PUBLICATIONS

Machine translation of CN 111137395 A obtained on Nov. 10, 2025.*

International Search Report (English and German) and Written Opinion for International application No. PCT/EP2023/058553, dated Jun. 30, 2023, 9 pages.

IPRP for International application No. PCT/EP2023/058553, dated Mar. 14, 2024, 15 pages.

* cited by examiner

100

100 section A-A section C-C section B-B

100

280

140

140

110

100

130

220

120

110

PEDAL COMPRISING A PEDAL AXLE, A BEARING MOUNTED THEREON, AND A SECURING ELEMENT

CROSS-REFERENCE TO RELATED APPLICATIONS

This application is a continuation of co-pending International Application No. PCT/EP2023/058553, filed Mar. 31, 2023, which is incorporated herein by reference in its entirety, and additionally claims priority from German Application No. 102022203453.8, filed Apr. 6, 2022, which is also incorporated herein by reference in its entirety.

TECHNICAL FIELD

The innovative concept described herein relates to a pedal, in particular for bicycles. According to the invention, the pedal comprises a pedal axle on which a bearing is mounted so that the pedal axle and the bearing together form a mounting unit which can be inserted into the pedal body or removed from the pedal body. The mounting unit comprising the bearing and the axle is secured by a securing element from falling out from the pedal body, wherein this securing element is accessible from outside.

BACKGROUND OF THE INVENTION

Pedals are usually used in vehicles which are driven by means of a pedal crank, i.e. the driving force is transmitted to the driven wheel or the driven wheels by means of a chain drive, a belt drive or the like via the pedal crank. The pedals serve to enable the driver to transmit a force to the pedal crank and thereby enable him to stand safely.

This form of drive is used in particular in two-wheel vehicles. These include non-motorized bicycles and bicycles with motor support, such as for example so-called pedelecs or e-bikes. However, multi-track vehicles, such as, for example, three-wheel vehicles or four-wheel vehicles, are also partially equipped with a crank drive.

The pedals are screwed into the crank. For this purpose, the pedals have an axle which has a thread on the vehicle side by means of which the pedal is screwed into a corresponding mating thread in the crank. The pedal body is mounted to be rotatable on this axle so that the pedal is always located horizontally during rotation of the crank in order to offer the driver a horizontal stepping surface and thus to enable continuous pedaling.

Occasionally, the pedal axle has to be removed from the pedal body, for example for maintenance purposes. There are essentially two different designs of pedals which differ from each other as follows:

A first design provides for the pedal body to comprise a cavity in which the pedal axle is arranged. This cavity extends completely through the pedal, i.e. the pedal body has an opening at each of two opposite ends, wherein the cavity extends between these two openings. The pedal axle is inserted into the pedal body on one side, i.e. through one of the two openings, so that the pedal axle extends through the pedal body within the cavity. A bearing, generally a radial ball bearing, is arranged on at least one of the openings, and advantageously on both openings. The bearings are usually pressure-fitted into the bores or openings of the pedal body. When the pedal axle is inserted into the pedal body, the pedal axle is inserted through the respective bearings so that the pedal axle is supported in the bearings. The inserted pedal axle is then fixed on the outlet-side opening, usually with a nut. Subsequently, the outlet-side opening is covered with a dust protection cap in order to prevent dust, dirt and moisture from entering.

In some situations, for example for the purpose of maintenance of the pedal axle and bearings, the pedal axle and the bearings are removed from the pedal body. However, this is often problematical, in particular in the bearings, and the bearings often cannot be removed from the pedal body without causing damage. Firstly, the dust protection cap has to be removed from the pedal body. Then, the nut has to be released in order to subsequently be able to pull the pedal axle from the pedal body. Since the bearing is pressure-fitted into the pedal body, it initially remains in the pedal body. In order to remove the bearing, an elongated object has to be pushed through the entire cavity, i.e. through the complete pedal body, from the opposite side, i.e. from that side from which the pedal axle is inserted into the pedal body, in order to be able to reach the bearing and then knock it out. The bearing is often destroyed here. A new bearing then has to be pressure-fitted into the pedal body. In addition, a second bearing can also be pressure-fitted on the opposite side of the pedal body. This bearing, too, has to be knocked out, as described above, wherein it is often destroyed. However, this is not particularly user-friendly and therefore discourages many users from regularly servicing their pedals.

A second design of pedals is also known. Here, the pedal body has an opening only on the vehicle-side pedal region, into which a single bearing is pressure-fitted. When compared to the first design described above, no pedal axle is present here which extends through the entire pedal body within a cavity. Instead, a type of stub axle is located in the single bearing. Since only this single bearing is present, the entire force has to be absorbed by this single bearing. As a result, this single bearing has to be significantly larger than the ball bearings which can be used in the first pedal design described above. The single bearing really is so large that it projects significantly beyond the two stepping surfaces of the pedal. As a result, continuously flat stepping surfaces are no longer obtained, which can have a disturbing effect for some drivers. In other words, due to the large bearing, the pedal has an elevation in the form of a knob on the vehicle-side pedal region, which projection projects beyond the otherwise evenly flat stepping surfaces of the pedal on both sides. In addition, in this design, too, it is almost impossible to remove the bearing which is pressure-fitted into the pedal body without causing damage. When compared to the first design, it is even more difficult to remove the bearing since it cannot be driven out from the opposite side due to the lack of a continuous cavity in the pedal body.

It would therefore be desirable to improve existing pedals so that they can be demounted in a simple manner, i.e. that the individual components of a pedal, in particular the pedal axle and the one or more bearings, can be removed easily from the pedal body. Furthermore, it would be desirable for continuously flat stepping surfaces of the pedal to be nevertheless realized without disturbing elevations.

SUMMARY

According to an embodiment, a pedal may have: a pedal body having an insertion opening and a cavity which, starting from the insertion opening, extends into the pedal body, wherein the insertion opening is configured as a single one-sided opening in the pedal body so that the pedal body is closed on a side opposite the insertion opening and has no further opening there, a pedal axle which is inserted into the pedal body through the insertion opening and extends into the pedal body along the cavity, at least one bearing arranged on the pedal axle, which is configured to support the pedal body to be rotatable on the pedal axle, wherein the bearing is configured to be a ball bearing, wherein the bearing is mounted on the pedal axle so that the pedal axle and the bearing mounted thereon form a mounting unit which can be inserted into the pedal body or removed from the pedal body, and a securing element which is configured to support the bearing on the pedal axle in an axial direction with respect to the pedal axle in order to secure the pedal axle against falling out from the pedal body, wherein the securing element extends from outside through the pedal body into the cavity to the bearing, wherein the securing element is accessible from outside.

The pedal according to the invention comprises a pedal body and a pedal axle. The pedal body has an insertion opening through which the pedal axle can be inserted into the pedal body. This insertion opening is located on that side of the pedal which faces the pedal crank or the vehicle (e.g. bicycle) when installed. A cavity is formed in the pedal body which, starting from the insertion opening, extends into the pedal body or a distance through the pedal body. Advantageously, the cavity can extend incompletely through the pedal body, i.e. the cavity does not extend completely through the pedal body, i.e. from the insertion opening to an opposite end of the pedal body. The pedal axle which is inserted into the pedal body through the insertion opening extends through the pedal body at least in sections within the cavity. Advantageously, the pedal axle can also extend only incompletely through the pedal body, i.e. not completely through the entire pedal body. A bearing is arranged on the pedal axle, which is configured to support the pedal body to be rotatable on the pedal axle. This can be, for example, a plain bearing or a ball bearing. Several bearings can also be arranged on the pedal axle. For example, a first bearing can be provided at a rear end of the pedal axle, i.e. at a rear axle section which is located close to the insertion opening. Alternatively or additionally, a bearing can be provided at a front end of the pedal axle, i.e. at a front axle section with which the pedal axle is inserted into the cavity in front and which, when installed, is accordingly located at a distance from the insertion opening. If a bearing is arranged on both ends of the pedal axle inserted into the pedal body, the pedal axle can be secured particularly well against tilting. This is similar to the first design of pedals mentioned above, in which an elongated pedal axle is provided which is supported by means of one or more bearings. Consequently, the forces can be distributed over the entire axle length, as a result of which the size of the bearings can be reduced. More precisely, the size of the bearings can be selected such that their outer circumference is smaller than the thickness of the pedal body (measured between the two stepping surfaces of the pedal). Thus, the one or more bearings can be integrated in the pedal body without additional elevations having to be provided in the pedal body for this purpose. This means that the pedal can have continuously flat stepping surfaces. The pedal axle can be secured against falling out after being inserted into the pedal body. According to the invention, a securing element is provided for this purpose, which is configured to support the bearing on the pedal axle in an axial direction with respect to the pedal axle so that the pedal axle is secured against falling out from the pedal body. This means that the securing element secures the bearing and the pedal axle supported in the bearing against an axial movement (reciprocating movement) in the cavity of the pedal body. The bearing and the pedal axle supported therein are thus arranged, by means of the securing element, at a specific or predefined position in the pedal body and fixed at this point in the pedal body. The securing element extends from outside through the pedal body to the bearing so that the securing element is accessible from outside. The securing element can thus be actuated while accessible from outside. The securing element can, for example, be brought into a fixing position in which it fixes the bearing and the pedal axle supported therein, in the manner described above, in the cavity of the pedal body. This fixing position is used when the pedal is completely mounted or assembled and is fastened to the vehicle (e.g. bicycle). However, the securing element can, of course, also be released from this fixing position so that the fixing of the bearing and the pedal axle is released again and the pedal axle is freely movable again within the pedal body. This would be conceivable if the pedal were to be demounted or disassembled in order to be able to maintain, for example, the pedal axle and the one or more bearings. Since the bearing is not pressure-fitted into the pedal body, after releasing the securing element, the pedal axle can advantageously be pulled out from the pedal body together with the bearing. This enables very simple maintenance of the pedal axle and bearings since the bearing can be removed from the pedal axle without causing damage. When installing the pedal axle, it is sufficient for the bearing to be plugged onto the axle and the axle to be subsequently inserted into the pedal body together with the bearing and fixed by means of the securing element. It is thus possible to dispense with cumbersome driving out and pressure-fitting of bearings from or into the pedal body.

BRIEF DESCRIPTION OF THE DRAWINGS

Some embodiments are illustrated by way of example in the drawing and will be explained below, in which.

DETAILED DESCRIPTION OF THE INVENTION

Figure 1:
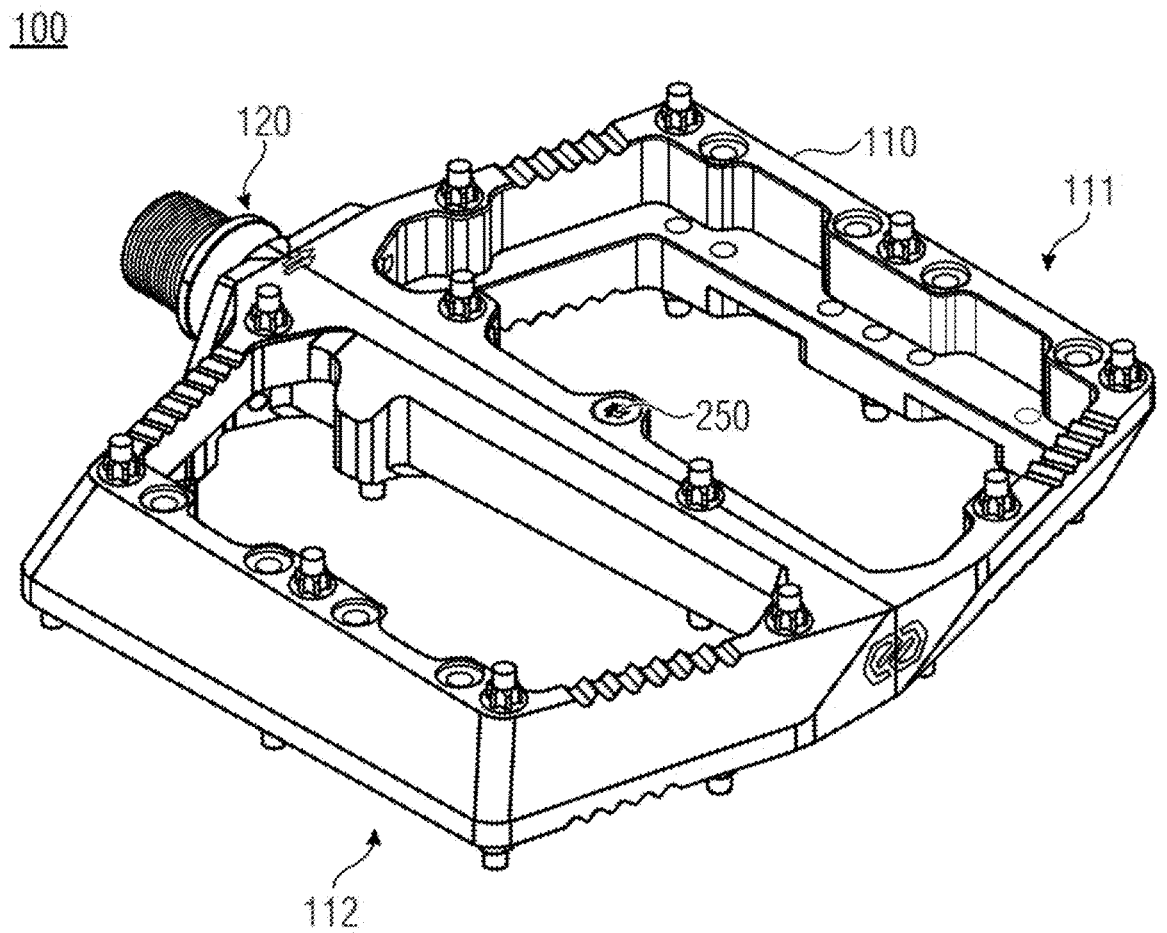
FIG. 1 shows a schematic perspective view of an inventive pedal according to an embodiment.

In the following, embodiments will be described in more detail referring to the figures, wherein elements with the same or similar function are provided with the same reference numerals.

The inventive pedal is described using the example of a bicycle pedal, in particular using the example of a so-called platform pedal, which is also referred to as flat pedal. However, all explanations made herein of course also apply to other pedal forms, such as click pedals. In addition, the description contained in this document applies to pedals, irrespective of the vehicle on which they are mounted. For example, the present invention relates both to pedals which are mounted on non-motorized bicycles and to pedals which are mounted on motorized bicycles, such as e-bikes, pedelecs and the like.

Figure 2:
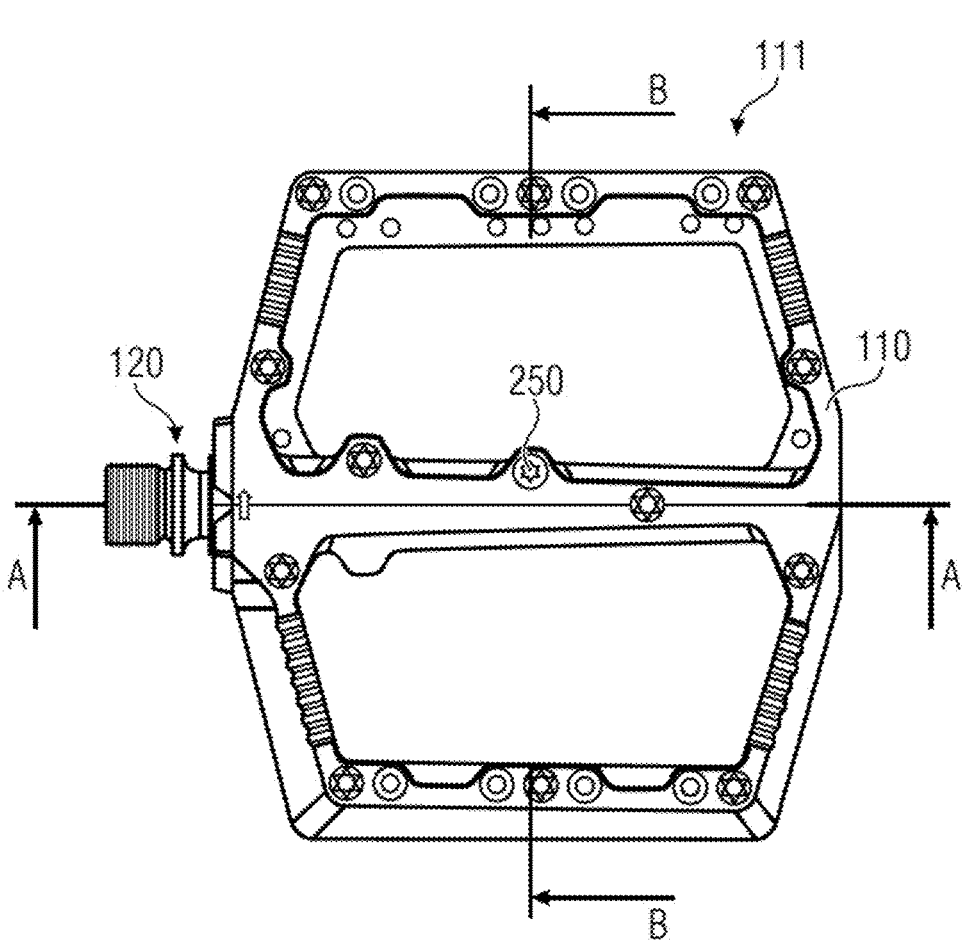
FIG. 2 shows a schematic top view of the inventive pedal according to an embodiment.

FIG. 1 shows a perspective view of an inventive pedal 100. FIG. 2 shows a top view of this pedal 100. This is a bicycle pedal, and in particular a so-called platform pedal, which is also referred to as flat pedal. The pedal 100 has a pedal body 110 with a first stepping surface 111 and an opposite second stepping surface 112. While pedaling, the driver stands with his shoe on one of these stepping surfaces 111, 112.

The pedal 100 also has a pedal axle 120 which extends at least partially through the pedal body 110. This can be seen more clearly in the sectional view in FIG. 3. A section A-A is shown through the pedal 100 shown in FIG. 2.

The pedal body 110 has an insertion opening 130. The pedal body 110 also has a cavity 113. Starting from the insertion opening 130, the cavity 113 extends into the pedal body 110. As shown here exemplarily, starting from the insertion opening 130, the cavity 113 can extend into the pedal body 110 or through the pedal body 110 up to approximately half of the pedal 100, or up to ⅔ of the pedal 100, or up to ¾ of the pedal 100. The cavity 113 thus does not extend completely through the entire pedal body 110. Thus, the pedal body 110 has only a single one-sided insertion opening 130 through which the pedal axle 120 can be inserted a distance into the pedal body 110. The pedal body 110 has no further opening on a side 140 of the pedal 100 opposite the insertion opening 130. This means that the pedal body 110 is closed on the side 140 opposite the insertion opening 130.

The pedal axle 120 can be inserted into the pedal body 110 or into the cavity 113 formed in the pedal body 110 through the insertion opening 130 provided in the pedal body 110. Here, the pedal axle 120 extends at least in sections into the pedal body 110 or through the pedal body 110 within the cavity 113. Advantageously, the pedal axle 120 extends to the end of the cavity 113 (located at a distance from the insertion opening 130). In other words, the pedal axle 120 can extend substantially completely through the cavity 113. If the cavity 113, as described above, does not extend completely through the pedal body 110, the pedal axle 120 arranged in the cavity 113 thus does not extend completely through the pedal body 110. This means that the pedal axle 120, starting from the insertion opening 130, can also extend into the pedal body 110 or through the pedal body 110 up to approximately half of the pedal 100, or up to ⅔ of the pedal 100, or up to ¾ of the pedal 100. In other embodiments (not explicitly illustrated here), the pedal axle 120 can extend almost completely through the pedal body 110, i.e. nearly to the side 140 of the pedal body 110 opposite the insertion opening 130. In this case, the same of course also applies to the cavity 113.

The pedal body 110 is supported to be rotatable on the pedal axle 120. This can be realized, for example, by means of suitable bearings 151, 152, 160. These are in particular radial bearings which limit the play of the pedal axle 120 in the radial direction.

For example, a first radial bearing 160, for example in the form of a plain bearing, can be provided in a rear axle section 121, i.e. in the region close to the insertion opening 130. This can be a sliding bush which is arranged around the pedal axle 120. A ball bearing would also be conceivable.

Alternatively or additionally, at least one bearing 151, in particular in the form of a radial bearing, can be provided in a front axle section 122, i.e. in a section of the pedal axle 120 located at a distance from the insertion opening 130. This can be, for example, a ball bearing, advantageously a grooved ball bearing, which is arranged on the pedal axle 120. As illustrated purely exemplarily in FIG. 3, a second bearing 152, for example also in the form of a ball bearing, can also be arranged on the pedal axle 120. Instead of the first and/or second ball bearing 151, 152, a plain bearing, for example in the form of a sliding bush, can also be provided here.

Only the bearing 151 will be described below. However, all the information also apply to the second bearing 152, or to any further bearings arranged on the pedal axle 120. The bearing 151 can be pushed onto the pedal axle 120 from the front. For this purpose, the pedal axle 120 can have a reduced diameter in the front axle section 122, or at its tip, which is smaller than the inner diameter of the bearing 151. The bearing 151 can thus be pushed onto the pedal axle 120 via this axle section 122 with reduced diameter. The pedal axle 120 can have an axle section with a larger diameter in the direction of the rear axle section 121, wherein this larger diameter is larger than the inner diameter of the bearing 151. At the transition from the smaller to the larger diameter, an edge is formed which serves as an end stop for the bearing 151 pushed onto the pedal axle 120. The bearing 151 can thus no longer slide further to the rear.

The pedal axle 120 can have a thread at the front axle section 122, or at the tip of the pedal axle 120. A nut 123 can be screwed onto the thread in order to fix the bearing 151 on the pedal axle 120. The bearing 151 is thus secured by the edge serving as an end stop against axial sliding in a first direction, and the bearing 151 is secured by means of the oppositely arranged nut against axial sliding in an opposite second direction. The bearing 151 can be arranged between the edge serving as an end stop and the nut.

The bearing 151 can thus be fixedly mounted on the pedal axle 120. An essential advantage over the known technology is that the fully assembled pedal axle 120, i.e. the pedal axle 120 together with the bearing 151 mounted thereon, can be inserted into the pedal body 110 or pulled out from the pedal body 110 as a unit. This means that when the pedal axle 120 is pulled out from the pedal body 110, the bearing 151 mounted on the pedal axle 120 is also pulled out at the same time. Subsequently, the nut 123 can be released and the bearing 151 can be pulled from the pedal axle 120 in a forward direction, i.e. over the tip of the pedal axle 120.

The insertion of the pedal axle 120 into the pedal body 110 is also significantly simpler and easier when compared to the known technology. The pedal axle 120 together with the bearing 151 mounted thereon can be inserted into the pedal body 110 as a unit. There is thus no need to pressure-fit one or more bearings into the pedal body 110.

Advantageously, the cavity 113 can have a clear width which is slightly larger (e.g. by a few tenths of a millimeter) than the outer circumference or the outer diameter of the bearing 151. As a result, it can firstly be ensured that the pedal axle 120 with the bearing 151 mounted thereon can be inserted into the cavity 113 of the pedal body 110 as a unit. Secondly, due to the slight oversize of the clear width of the cavity 113 with respect to the outer diameter of the bearing 151, it can be guaranteed that the bearing 151 fits into the cavity 113 and the pedal axle 120 can thus be inserted into the pedal body 110 smoothly, and that the bearing 151 can be supported with its outer circumference on the wall of the cavity 113, i.e. the bearing 151 can be inserted into the cavity 113 to be precisely fitting or without play. There is thus no play between the bearing 151 and the wall of the cavity 113 so that the pedal axle 120 is arranged to be precisely fitting in the pedal body 110 and radial forces can be absorbed by the bearing 151.

Figure 4:
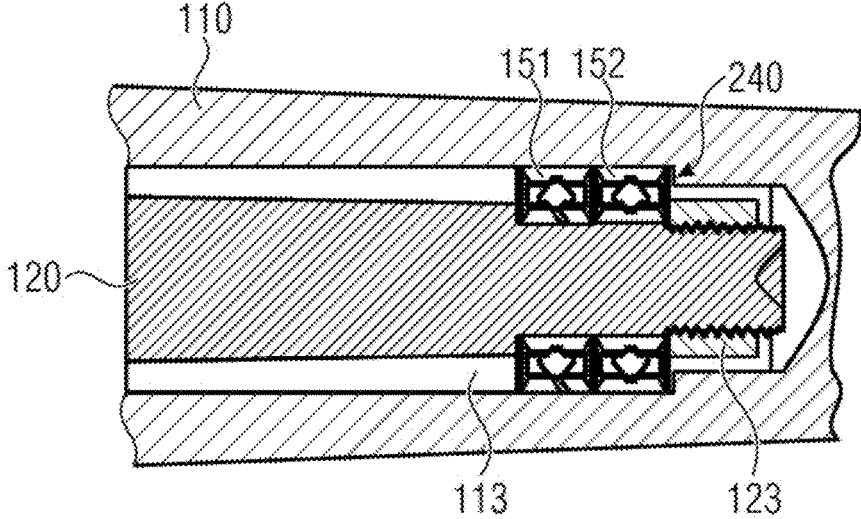
FIG. 4 shows an enlarged part of the pedal axle from FIG. 3.

As can be seen in FIG. 4, the pedal body 110 can comprise a projection 240 protruding into the cavity 113 at an end of the cavity 113 opposite the insertion opening 130. The bearing 151 can be supported on this projection 240 in an axial direction. The projection 240 can serve as an end stop up to which the unit of pedal axle 120 and bearing 151 mounted thereon can be inserted into the pedal body 110. The projection 240 can, as shown in FIG. 4, be formed to be circumferential so that the bearing 151 can be supported thereon on its entire circumference.

In summary, it can thus be stated at first that at least one bearing 151 can be mounted on the pedal axle 120 so that this bearing 151 is fixedly connected to the pedal axle 120, wherein the pedal axle 120 and the bearing 151 mounted thereon form a unit. This unit of pedal axle 120 and bearing 151 can then be inserted into the cavity 113 formed in the pedal body 110 through the insertion opening 130. The cavity 113 can extend incompletely through the pedal body 110, i.e. the cavity 113 does not extend completely through the entire pedal body 110. The unit of pedal axle 120 and bearing 151 can be inserted into the cavity 113 up to an optionally present projection 240. This projection 240 supports the bearing 151 in an axial direction so that the pedal axle 120 cannot be inserted further axially into the pedal body 110. The projection 240 thus forms an end stop for the pedal axle 120.

In the radial direction, the bearing 151 is supported with its outer circumference on the wall of the cavity 113, i.e. on the inside of the pedal body 110. The pedal axle 120 is thus fixed in the radial direction and radial forces can be absorbed by the bearing 151.

In order to secure the inserted pedal axle 120 against falling out from the pedal body 110, a securing element 250 is provided according to the invention. The securing element 250 is configured to support the bearing 151 on the pedal axle 120 in an axial direction with respect to the pedal axle 120. More precisely, the securing element 250 prevents an axial movement of the pedal axle 120 in the direction of the insertion opening 130 so that the pedal axle 120 can no longer slide in the direction of the insertion opening 130 and thus out of the pedal body 110.

Figure 5:
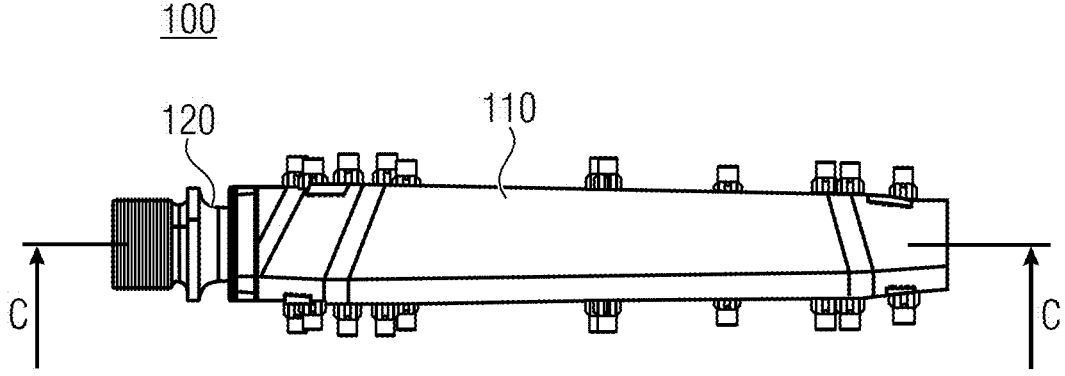
FIG. 5 shows a schematic side view of an inventive pedal according to an embodiment.
Figure 6:
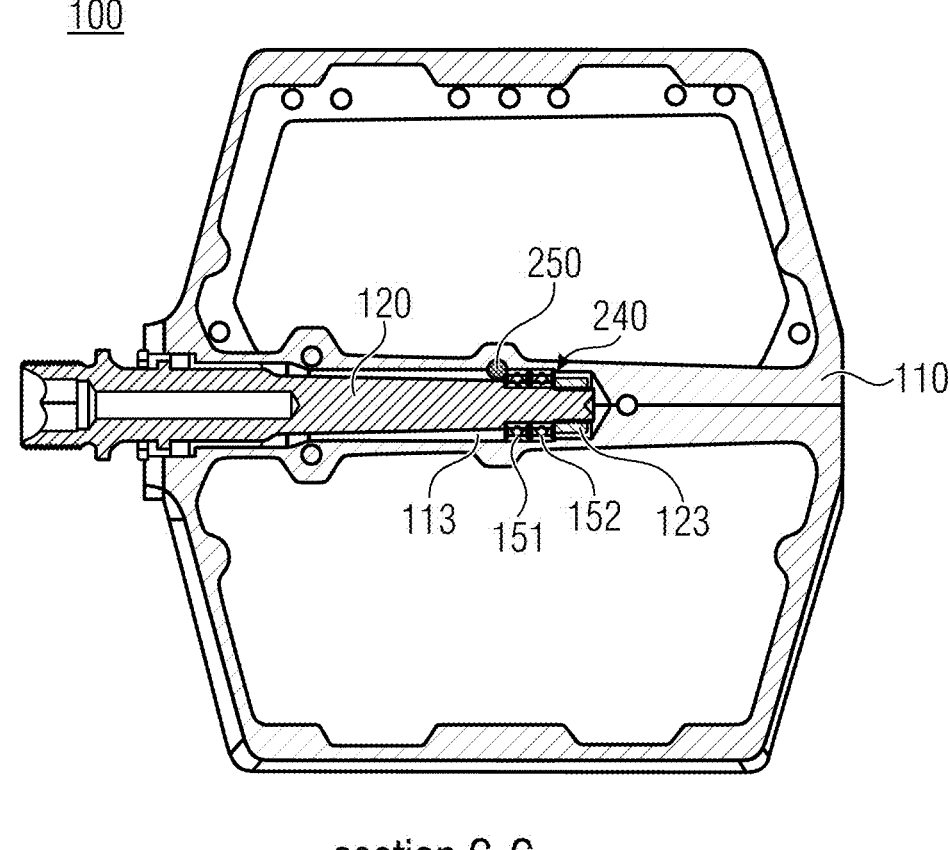
FIG. 6 shows a schematic sectional view along a section line C-C through the pedal shown in FIG. 5.

For a more detailed description of the securing element 250 according to the invention, reference is made to FIGS. 5 and 6. FIG. 5 shows a side view of a pedal 100. FIG. 6 shows a sectional view along the section line C-C through the pedal 100 shown in FIG. 5.

The securing element 250 extends from outside through the pedal body 110 into the cavity 113 to the bearing 151 so that the securing element 250 is accessible from outside. The securing element 250 is in direct physical contact with the bearing 151. The securing element 250 can be in contact with a surface of the bearing 151 facing the insertion opening 130.

Figure 7:
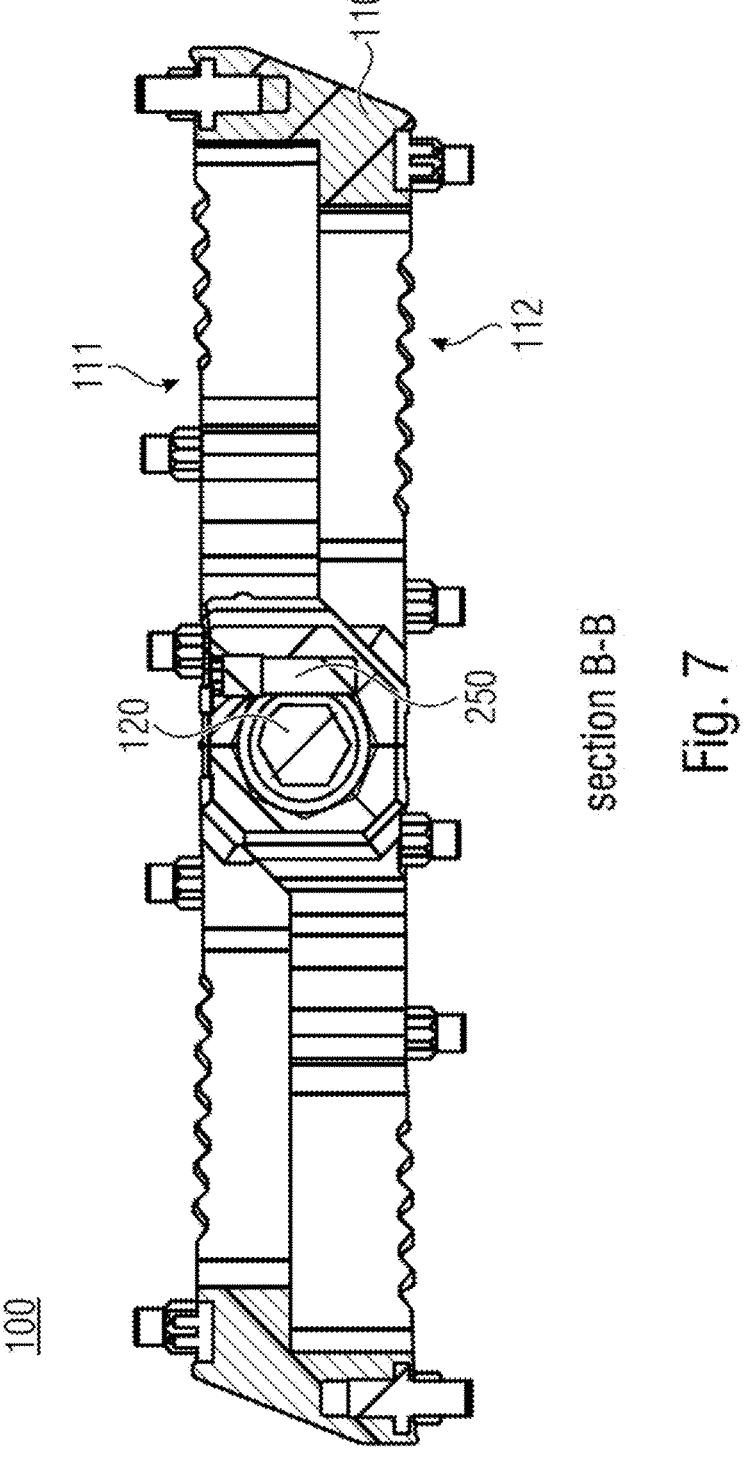
FIG. 7 shows a schematic sectional view along a section line B-B through the pedal shown in FIG. 2.

As can be seen in FIG. 7, the securing element 250 can extend in a radial direction with respect to the pedal axle 120 through the pedal body 110 to the bearing 151. For example, the securing element 250 can extend essentially perpendicularly to the stepping surface 111 of the pedal 100 or can be inserted into the pedal body 100 to be perpendicular to the stepping surface 111.

FIG. 7 shows a sectional view through the pedal 100 shown in FIG. 2 along a section line B-B. The section line B-B extends, viewed from the insertion opening 130, in front of the bearing 151, which is why the bearing 151 cannot be seen in FIG. 7. However, it can be seen clearly in FIG. 7 that the securing element 250 extends perpendicular to the stepping surface 111 of the pedal 100 through the pedal body 110.

Referring again to FIG. 6, it can be seen that the bearing 151 is supported on the securing element 151 protruding into the cavity 113. The securing element 250 exerts an, with respect to the pedal axle 120, axially directed supporting force on the bearing 151. In other words, the bearing 151 is supported on the securing element 250 protruding perpendicularly into the cavity 113 so that the unit comprising the pedal axle 120 and the bearing 151 mounted thereon is secured against an axial movement in the direction of the insertion opening 130. The pedal axle 120 is thus axially fixed in the pedal body 110 and can no longer slide out from the pedal body 110.

As can be seen in FIGS. 1, 2 and 7, the securing element 250 can be configured, for example, in the form of a screw which is screwed perpendicularly into the stepping surface 111 of the pedal body 110. For this purpose, the pedal body 110 can have a corresponding threaded bore. This threaded bore is provided at a position on the pedal body 110 below which the bearing 151 is located. More precisely, the threaded bore is located shortly in front of the bearing 151, i.e. the threaded bore is not arranged directly above the bearing 151 but is offset slightly rearward in the direction of the insertion opening 130. The threaded bore and thus also the securing element 250 screwed into the threaded bore can thus be arranged in front of the bearing 151 as viewed from the insertion opening 130. Thus, the securing element 250 can enter the cavity 113 directly next to the bearing 151 and come into contact with the lateral surface or outer surface of the bearing 151 so that the bearing 151 can be supported on the securing element 250. The unit of pedal axle 120 and bearing 151 is thereby secured against sliding out from the pedal body 110.

The bearing 151 can be arranged along the pedal axle 120 between the securing element 250 and the projection 240. The bearing 151 can be clamped between the securing element 250 and the projection 240 so that the bearing 151 is fixed in the axial direction. As a result, the pedal axle 120 can no longer move back and forth, or reciprocate, in the pedal body 110. The projection 240 secures the pedal axle 120 against an axial movement in a first axial direction, i.e. in the direction away from the insertion opening 130, i.e. in an insertion direction in which the pedal axle 120 can be inserted into the pedal body 110. By contrast, the securing element 250 secures the pedal axle 120 against an axial movement in a second axial direction opposite the first axial direction, i.e. in the direction towards the insertion opening 130, i.e. in a removal direction in which the pedal axle 120 can be removed from the pedal body 110.

As mentioned in the beginning, the pedal axle 120 with the bearing 151 mounted thereon can form a unit so that the pedal axle 120 together with the bearing 151 can be inserted into the pedal body 110 or into the cavity 113 provided in the pedal body 110 or removed again from there. This offers the advantage that when compared to the known technology, no continuous bore has to be provided through the entire pedal body 110 in order to be able to pressure-fit a bearing into the pedal body 110 on the exit side, i.e. on the side 140 opposite the insertion opening 130. As mentioned before, the pedal axle 120 according to the invention and the bearing 151 arranged thereon together form a mounting unit. The bearing 151 is thus mounted on the pedal axle 120, whereas in the known technology, by contrast, the bearing is pressure-fitted into the pedal body 110 in order to subsequently pass through the pedal axle 120.

Figure 8:
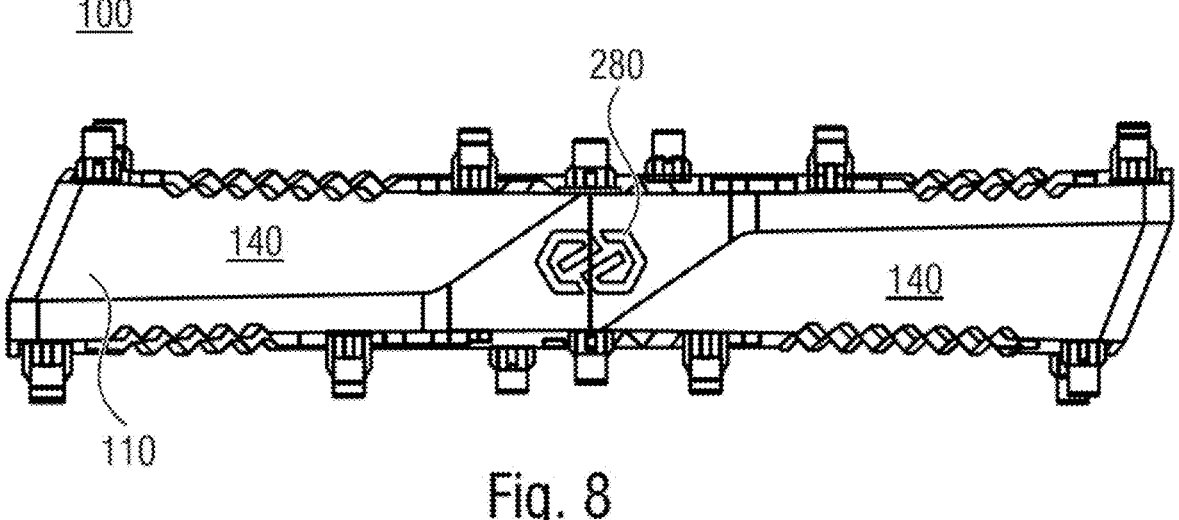
FIG. 8 shows a schematic front view of the front side of the pedal according to an embodiment.

FIG. 8 shows a front view of the front side of the pedal 100, i.e. of the side 140 of the pedal 100 opposite the insertion opening 130, which faces away from the vehicle (e.g. bicycle) when mounted. Here, it can be seen that the pedal body 110 is closed on this front side 140, i.e. it has no opening into which a bearing is pressure-fitted. Thus, no opening has to be covered with an additional dust protection cap, as is the case in the known technology. These dust protection caps can become loose so that the protective effect is no longer necessarily given and dust, dirt and moisture can enter the pedal body 110. Since in the inventive pedal 100, by contrast, no opening and thus also no dust protection cap are necessary on the front side 140 (i.e. the pedal 100 is closed on the front side 140), a significantly improved protection against dust, dirt and moisture can be ensured.

A further advantage is that the pedal 100 comprises more solid material and is thus more stable. In addition, there is space on the closed front side 140 to provide, for example, a manufacturer logo 280.

Figure 9:
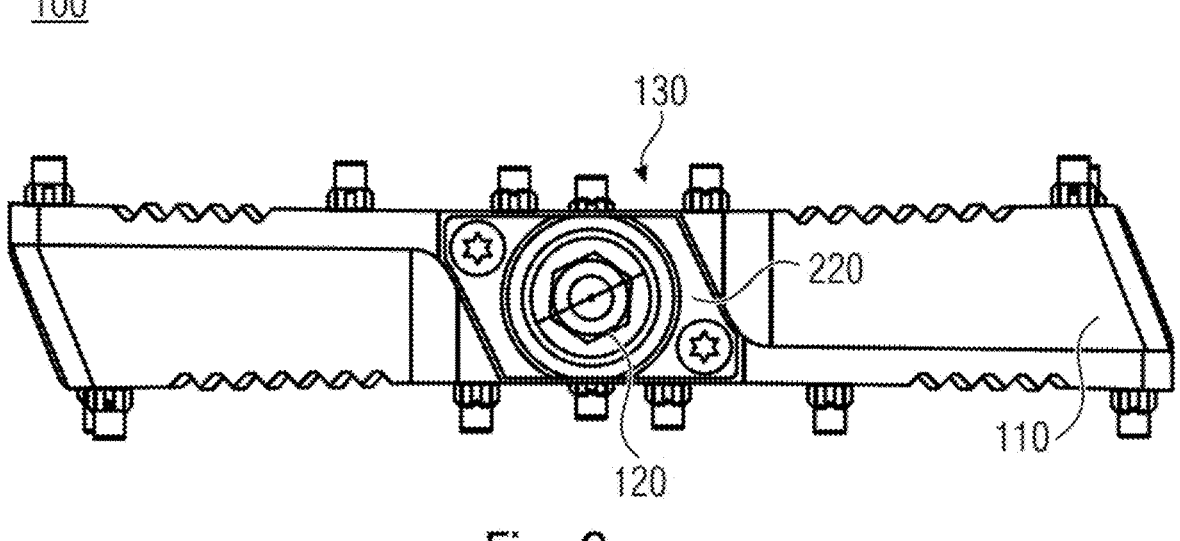
FIG. 9 shows a schematic front view of the rear side of the pedal according to an embodiment.

FIG. 9 shows a front view of the rear side of the pedal 100, i.e. of the side in which the insertion opening 130 is provided and which faces the vehicle (e.g. bicycle) when mounted. A cover 220 can be arranged on the pedal axle 120, by means of which the insertion opening 130 can be closed. The cover 220 offers an additional protection against dirt, dust and moisture entering. The cover 220 can, for example, be screwed onto the pedal body 110.

Figure 3:
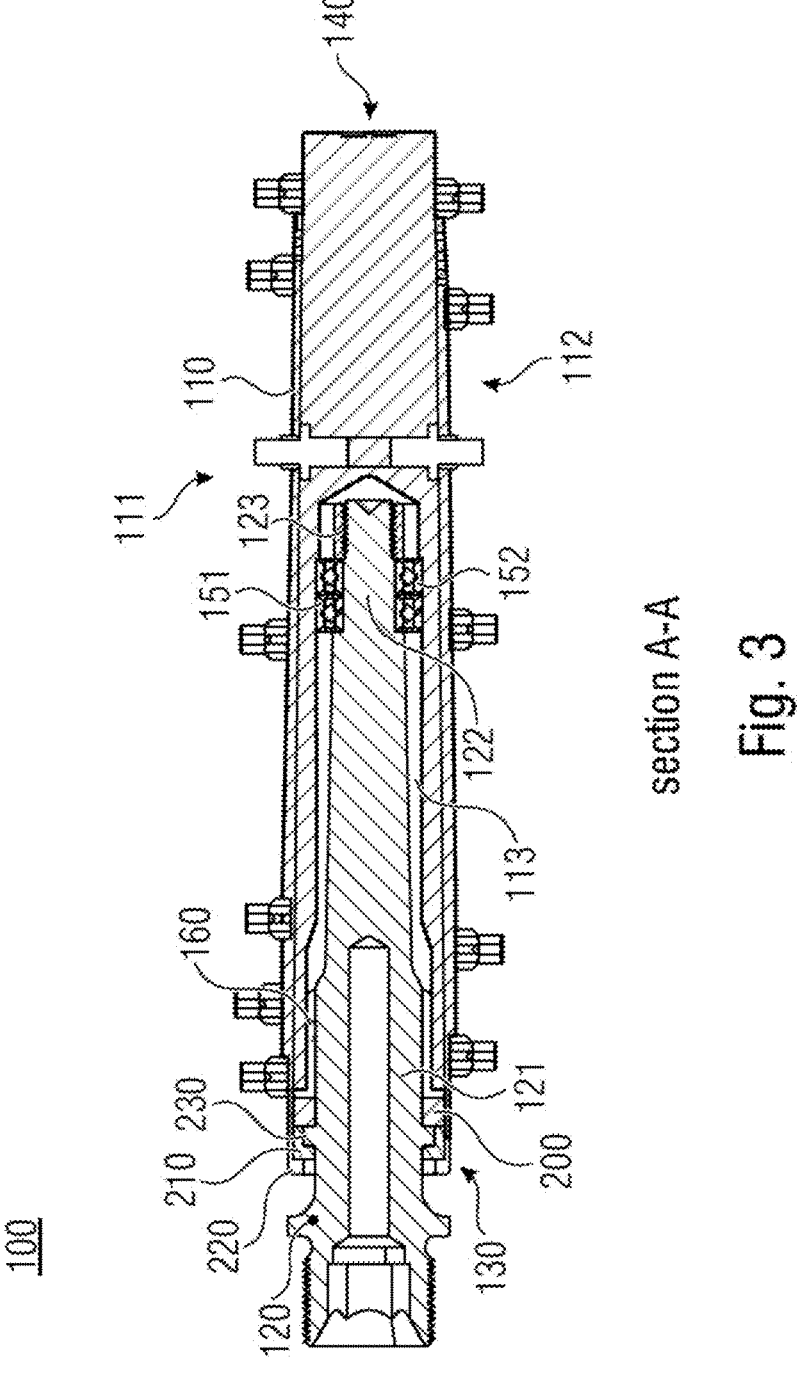
FIG. 3 shows a schematic sectional view along a section line A-A through the pedal shown in FIG. 2.

Referring to FIG. 3, it can be recognized that the cover 220 can be axially supported on a circumferential collar 230 of the pedal axle 120. This means that the cover 220 is supported on the circumferential collar 230 and thereby secures the pedal axle 120 against axial sliding along the pedal axle 120. For example, the cover 220 can thereby prevent the pedal axle 120 from sliding out from the pedal body 110.

A wave washer 210 can optionally be provided between the cover 220 and the circumferential collar 230, in the region of the insertion opening 130. The wave washer 210 can have an L-shape so that the wave washer 210 engages into the collar 230. The wave washer 210 can be supported on the collar 230 formed on the pedal axle 120. When screwing on the cover 220, the wave washer 210 is pressed against the collar 230 in order to keep the wave washer 210 in constant engagement with the circumferential collar 230 of the pedal axle 120. The wave washer 210 thus exerts an axial supporting force on the pedal axle 120 and thereby secures the pedal axle 120 against falling out from the pedal body 110. The wave washer 210 and the cover 220 together can thus ensure that the pedal axle 120 is secured against falling out from the pedal body 110. This offers an additional protection, in addition to the above-described inventive securing element 250. The wave washer 210 can therefore also be referred to as securing washer. The wave washer 210 can furthermore prevent dirt, dust and moisture from entering the cavity 113. The wave washer 210 can, for example, include felt.

A further wave washer 200 can optionally be arranged between the plain bearing 160 and the collar 230. The wave washer 200 can, for example, include felt. The wave washer 200 can perform a sealing effect in order to prevent dirt, dust and moisture from entering. This wave washer 200 can therefore also be referred to as dust seal.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A pedal comprising:
a pedal body comprising a stepping surface on which the driver stands while pedaling, the pedal body further comprising an insertion opening and a cavity which, starting from the insertion opening, does not extend completely through the pedal body but only by up to half of the pedal, or by up to ¾ of the pedal, into the pedal body,
wherein the insertion opening is configured as a single one-sided opening in the pedal body so that the pedal body is closed on a side opposite the insertion opening and comprises no further opening there,
a pedal axle which is inserted into the pedal body through the insertion opening and extends into the pedal body along the cavity,
at least one bearing arranged on the pedal axle, which is configured to support the pedal body to be rotatable on the pedal axle, wherein the at least one bearing is a ball bearing,
wherein the at least one bearing is mounted on the pedal axle so that the pedal axle and the at least one bearing mounted thereon together form a mounting-unit, wherein the mounting unit can be inserted into the pedal body or removed from the pedal body, and
a securing element which is configured to support the at least one bearing on the pedal axle in an axial direction with respect to the pedal axle in order to secure the pedal axle against falling out from the pedal body,
wherein the securing element is configured as a screw being screwed perpendicular into the stepping surface as to extend from outside through the pedal body into the cavity to the at least one bearing, wherein the securing element is accessible from outside.

2. The pedal according to claim 1, wherein the securing element is in direct physical contact with the at least one bearing.

3. The pedal according to claim 1, wherein the securing element is in contact with a surface of the at least one bearing facing the insertion opening.

4. The pedal according to claim 1, wherein the securing element extends in a radial direction with respect to the pedal axle through the pedal body to the at least one bearing, and wherein the securing element exerts an, with respect to the pedal axle, axially directed supporting force on the at least one bearing.

5. The pedal according to claim 1, wherein a projection extending into the cavity is formed in the pedal body on which the at least one bearing is supported in the axial direction.

6. The pedal according to claim 5, wherein the projection is formed to be circumferential so that the at least one bearing is supported thereon on its entire circumference.

7. The pedal according to claim 5, wherein the at least one bearing is arranged along the pedal axle between the securing element and the projection.

8. The pedal according to claim 1, wherein the securing element is arranged in front of the at least one bearing as viewed from the insertion opening.

9. The pedal according to claim 1, wherein the inner width of the cavity is larger than the outer circumference of the at least one bearing.

10. The pedal according to claim 1, further comprising a securing washer fitted over a circumferential collar formed on the pedal axle in order to support the pedal axle in the axial direction and to secure it against falling out from the pedal body.

11. The pedal according to claim 10, further comprising a cover which is mounted on the pedal body and covers the insertion opening, wherein the cover is in contact with the securing washer to keep the securing washer in contact with the circumferential collar on the pedal axle.

12. A pedal comprising:

a pedal body comprising a stepping surface on which the driver stands while pedaling, the pedal body further comprising an insertion opening and a cavity which, starting from the insertion opening, extends partially into the pedal body, wherein the insertion opening is configured as a single one-sided opening in the pedal body so that the pedal body is closed on a side opposite the insertion opening and comprises no further opening there, a pedal axle which is inserted into the pedal body through the insertion opening and extends into the pedal body along the cavity, at least one bearing arranged on the pedal axle, which is configured to support the pedal body to be rotatable on the pedal axle, wherein the at least one bearing is a ball bearing, wherein the at least one bearing is mounted on the pedal axle so that the pedal axle and the at least one bearing mounted thereon together form a mounting-unit, wherein the mounting-unit can be inserted into the pedal body or removed from the pedal body, and a securing element which is configured to support the at least one bearing on the pedal axle in an axial direction with respect to the pedal axle in order to secure the pedal axle against falling out from the pedal body, wherein the securing element is configured as a screw being screwed perpendicular into the stepping surface as to extend from outside through the pedal body into the cavity to the at least one bearing, wherein the securing element is accessible from outside, wherein the at least one bearing is disposed on a front axle section of the pedal axle at an end of the cavity, and wherein the pedal further comprises a further bearing disposed on the front axle section of the pedal axle between the at least one bearing and the end of the cavity, wherein the bearings together form the mounting-unit, and wherein the pedal further comprises a projection extending into the cavity at the end of the cavity opposite that of the insertion opening, wherein the securing element is in contact with a surface of the at least one bearing facing the insertion opening and wherein the projection is in contact with a surface of the further bearing facing the end of the cavity.

\* \* \* \* \*